4-17-73    XR    3,728,478

United States Patent [19]
Turner et al.

[11] 3,728,478
[45] Apr. 17, 1973

[54] ELECTRO-OPTICAL TRACKER
[75] Inventors: Douglas M. Turner; Donald G. Quist, both of China Lake, Calif.
[73] Assignee: The United States of America as represented by the Secretary of the Navy
[22] Filed: May 8, 1968
[21] Appl. No.: 727,741

[52] U.S. Cl.........178/6.8, 178/DIG. 21, 250/203 CT
[51] Int. Cl.................................................H04n 3/22
[58] Field of Search........................178/7.55 E, 6.8, 178/DIG. 21; 250/203 CT

[56] References Cited
UNITED STATES PATENTS 3,518,368   6/1970   Olson ...........................178/DIG. 21
3,257,505   6/1966   Wechel ...................178/6.8
3,341,653   9/1967   Kruse ......................178/6.8

*Primary Examiner*—Benjamin A. Borchelt
*Assistant Examiner*—H. A. Birmiel
*Attorney*—George J. Rubens and Roy Miller

[57] ABSTRACT

A target adaptive television contrast tracker for missile application wherein the adaptive feature comprises a linearly weighed tracking gate, which keeps account of positive target edge information, and means for determining the width of the target to keep account of negative target edge information. The tracking gate is arranged to coincide with the positive target edge information, and the mean raster position between the positive and negative target information coincides with the center of the target.

5 Claims, 5 Drawing Figures

INVENTORS.
DOUGLAS M. TURNER
DONALD G. QUIST
BY
ROY MILLER
ATTORNEY.

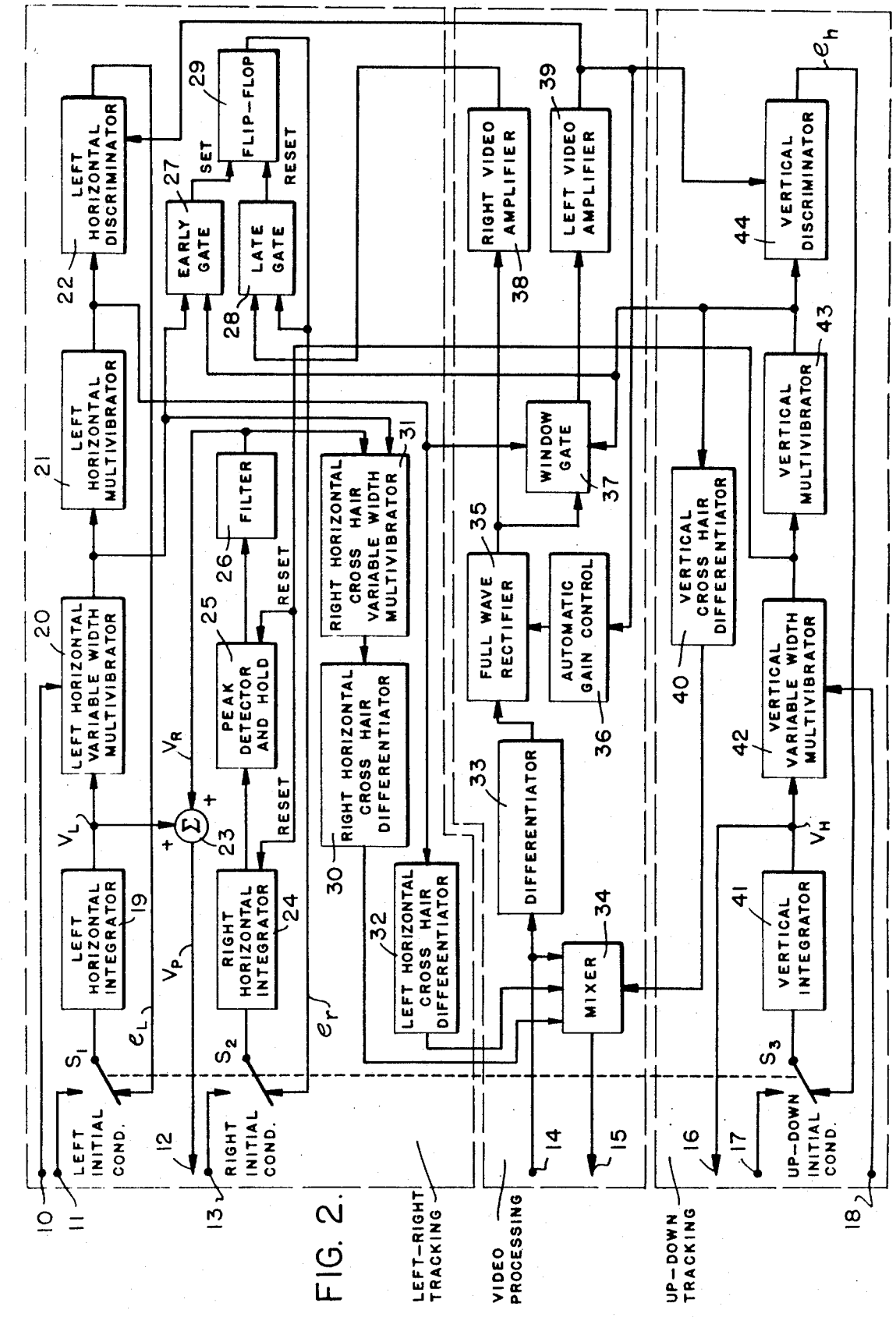

ELECTRO-OPTICAL TRACKER

The invention described herein may be manufactured and used by or for the Government of the United States of America for governmental purposes without the payment of any royalties thereon or therefor.

BACKGROUND OF THE INVENTION

This invention relates to an automatic tracking system of the type in which the positional information regarding the object to be tracked is derived by means of a television camera.

The basis of this system is a gyro-stabilized, closed circuit, television camera that furnishes the missile operator an exact picture of the target and the surrounding area.

One such system is the television target tracking system disclosed in the copending patent application of Jack A. Crawford et al., Ser. No. 224,594, filed Sept. 12, 1962 and the improvements disclosed in the copending patent application of Joseph S. Brugler et al., Ser. No. 487,635, filed Sept. 15, 1965, Joseph S. Brugler, Ser. No. 487,637, also filed Sept. 15, 1965, and Joseph S. Brugler, Ser. No. 703,228, filed Jan. 25, 1968.

In the Crawford et al. system there are two identical automatic feedback control type tracking channels for tracking in the horizontal and vertical directions, respectively, relative to a conventional television raster. The video processing section electronically differentiates the video signals received from the camera and converts steps of video to short duration pulses. Full-wave rectification then creates output pulses of the same polarity, regardless of whether the change in target brightness is dark to light or light to dark. This differentiation takes place only in the direction along scanning lines. No differentiated video is obtained from the top or bottom edge of the target, only from the horizontal left and right edges. Thus, the system will center track vertically and track either the left or right edge horizontally.

The television tracker disclosed in the copending patent application of Joseph S. Brugler, Ser. No. 703,228 is directed to a target adaptive feature comprising two independent linearly weighted tracking gates, the first keeps account of positive target edge information, and the second keeps account of negative target edge information. The separation of the gates is arranged to coincide with the separation of the target edges, and the mean raster position of the gates coincides with the center of the target.

SUMMARY OF THE INVENTION

In order to maintain a central aim point horizontally by means of contrast tracking, without employing two detecting areas or gates, both target edge positions must be known to the tracker. This is accomplished by employing a single detecting area or gate for the left horizontal edge. The pulse used to trigger the detecting area or gate is additionally used to set a flip-flop. A video pulse which corresponds to the right edge of the target resets the flip-flop. Thus, the output of the flip-flop consists of pulses corresponding to the width of the target. The peak time integral of the flip-flop output is held for an entire frame, and then filtered. The voltage derived from the detecting area corresponds to the left edge of the target and the voltage derived from the filter corresponds to the right edge of the target, therefore their sum corresponds to the center of the target. Up-down tracking is accomplished as in the aforementioned Crawford et al. system.

To initiate tracking, a missile operator aims the tracker to center the target within the cross hairs which appear on his video monitor. He then "locks-on" to the target by simultaneously freeing the tracker from its preset initial condition, and uncaging the gyro-stabilized television camera. The tracking areas are then set up on a target and remain "locked-on" until impact. The missile flies in response to the error command signals which are the outputs of the sum of the left horizontal integrator and the filter, and the vertical integrator, to prevent loss of lock-on and cause impact to occur at the central aim point.

BRIEF DESCRIPTION OF THE DRAWINGS

FIG. 2 is a block diagram of a preferred embodiment of the invention;

DESCRIPTION OF THE PREFERRED EMBODIMENT

Figure 1:
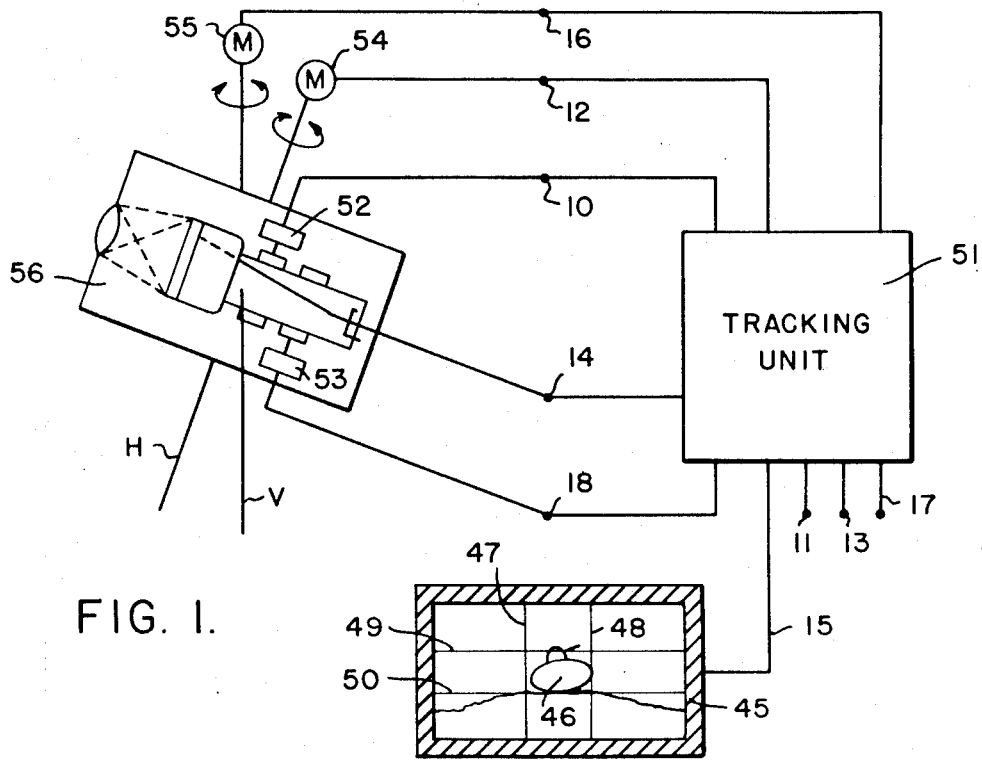
FIG. 1 is a block diagram of the missile and tracking system.

The invention comprises the tracking unit of an automatic television tracking system which continuously aims the optical axis of a gyro-stabilized television camera at a preselected target. Referring to FIG. 1, the automatic television tracking system as illustrated includes a television camera 56 mounted for movement in a horizontal plane about a vertical axis V and for movement in a vertical plane about a horizontal axis H. Torquer amplifiers and motors 54 and 55 continuously operate to aim camera 56 at a preselected target 46 in response to signals 12 and 16 received from the tracking unit.

Target 46 is selected by use of a monitor display 45 which is operatively connected to the tracking unit by a closed circuit link 15. The tracking unit receives target contrast and brightness information from an output 14 of a vidicon television camera 56. In order to synchronize the tracking unit with the deflection of the electronic beam scanning within the vidicon, horizontal deflection generator 52 and vertical deflection generator 53 emit horizontal synchronization pulses 10 and vertical synchronization pulses 18 which are fed into the tracking unit.

As shown in FIG. 2, prior to target "lock-on" the up-down or vertical servo loop, the left servo loop and the right tracking channel are open circuited by means of switches $S_1$, $S_2$ and $S_3$. Vertical integrator 41, left horizontal integrator 19 and right horizontal integrator 24 have initial conditions placed upon them by internal feedback resistors to produce a constant dc output to center the tracking cross hairs about the mean raster position.

To "lock-on" to a target, target 46 is placed at the center of cross hairs 47, 48, 49 and 50 shown in FIG. 1. This is accomplished by aiming the missile at the target in a suitable manner. To initiate tracking, switches $S_1$, $S_2$ and $S_3$ are simultaneously thrown, closing the left and vertical servo tracking loops and enabling the right tracking channel. Left horizontal cross hair 47 attaches next to the left side of the target and right horizontal cross hair 48 attaches to the right side of the target.

Figure 5:
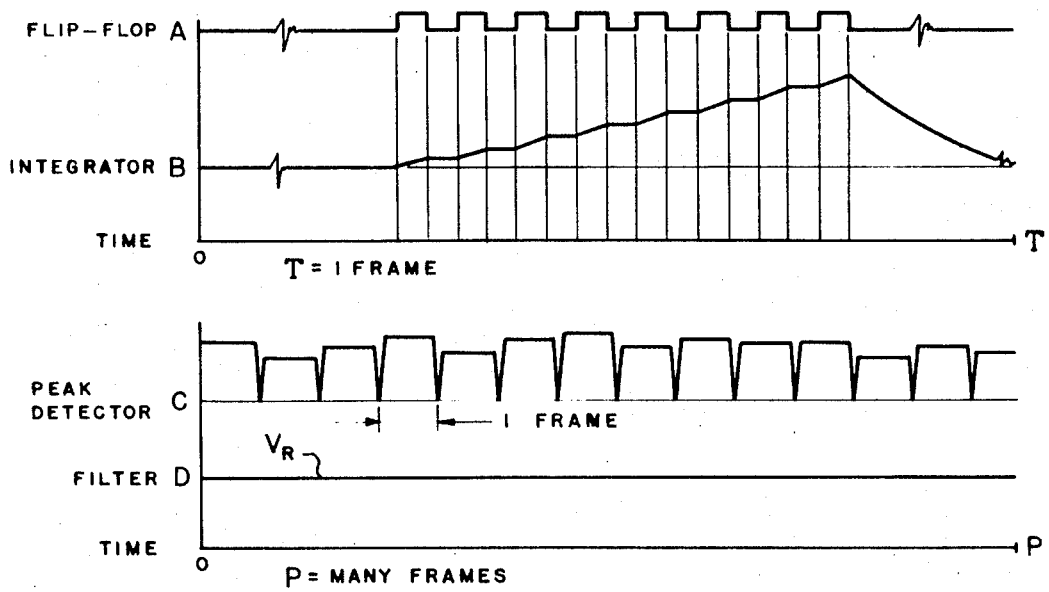
FIG. 5 shows waveforms illustrating the operation of the flip-flop-integrator-peak detector-filter system.
Figure 3:
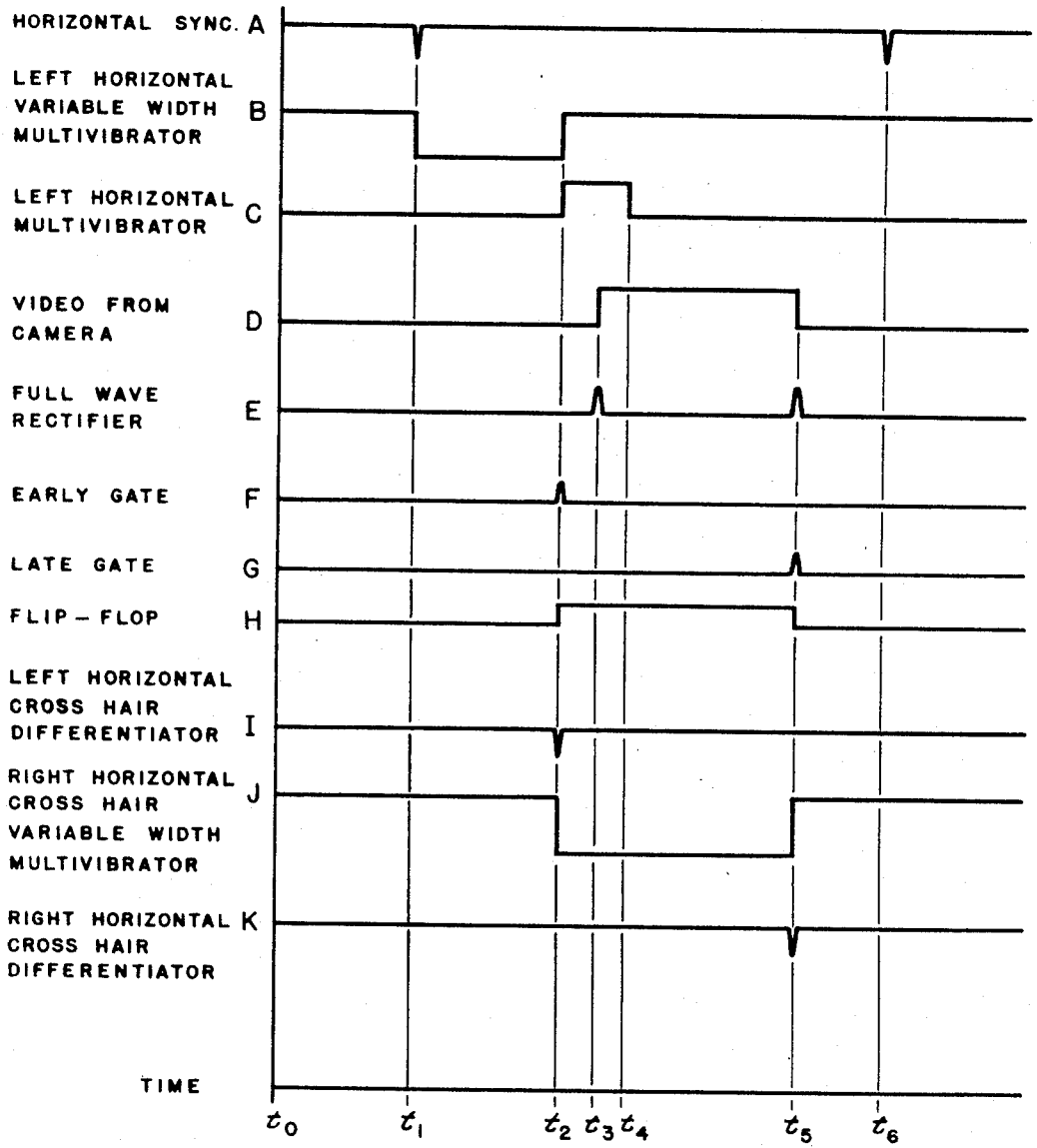
FIG. 3 shows waveforms appearing at certain points of the left-right tracking portion of the system of FIG. 2.
Figure 4:
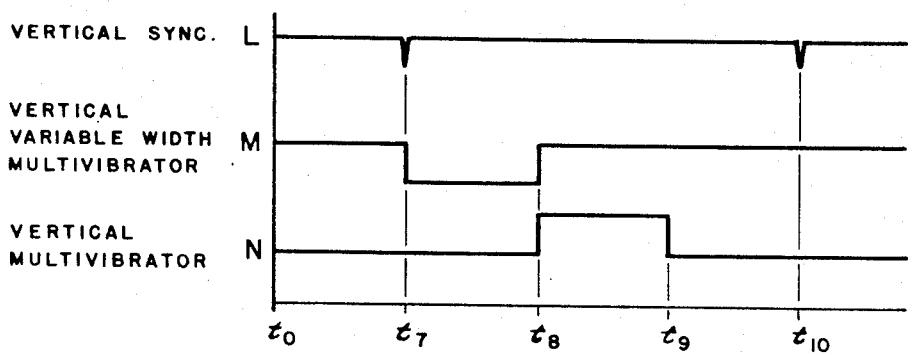
FIG. 4 shows waveforms appearing at certain points of the up-down tracking portion of the system of FIG. 2.

The waveforms shown in FIGS. 3, 4 and 5 give insight into the operation of the tracker. FIG. 3A shows the waveform representative of the output of horizontal sync 52. The horizontal sync pulses, which occur at times $t_1$ and $t_6$ trigger a variable width multivibrator 20 whose output waveform is shown in FIG. 3B. Left tracking gate 47 which exists from time $t_2$ until $t_4$ is initiated by the trailing edge, after differentiation of the output from left horizontal variable width multivibrator 20 as shown in FIG. 3C. As shown in FIG. 3B, left horizontal variable width multivibrator 20 is triggered by horizontal sync pulse 10 and has a pulse width determined by the magnitude of the output, $V_L$, of left horizontal integrator 19.

The output from left horizontal multivibrator 21 opens "window" gate 37 during time $t_2$ until $t_4$ and corresponds to left horizontal cross hair 47.

Video output 14 from camera 56 changes in magnitude as the electron beam of the television camera sweeps across the raster. Thus, when a target is perceived by the camera, the output is either increased or decreased according to the target contrast ratio. FIG. 3D shows an increase in output; however, it should be noted that a decrease in output may also be perceived depending on whether the target-to-background contrast ratio is greater or less than zero.

Assuming that the tracker is in operation, the time $t_3$ at which the camera first detects the target will occur somewhere between time $t_2$ and $t_4$, which is during the time interval when left horizontal multivibrator 21 is in operation and "window" gate 37 is open. As the beam further sweeps across the vidicon horizontally, the right edge of the target will leave the field of view at the time $t_6$.

Raw video 14 from camera 56 enters differentiator 33 to emerge as a positive voltage spike at time $t_3$ and a negative voltage spike at time $t_5$ if the target is of such brightness that the video output increases as shown in FIG. 3D. The output of differentiator 33 will be a negative voltage spike at time $t_3$ and a positive voltage spike at time $t_5$ if the target produces a video output 14 which is the inverse of that shown in FIG. 3D. The polarity of the pulses shown in FIG. 3D depends upon whether the target is lighter or darker than its environment as previously explained.

Since full-wave rectifier 35 is employed, the raw video of FIG. 3D will always be converted into positive voltage spikes as shown in FIG. 3E. The voltage spike of FIG. 3E occurring at time $t_3$ will pass through "window" gate 37 which is open only from time $t_2$ until $t_4$.

The output of full-wave rectifier 35 is next coupled from "window" gate 37 to left video amplifier 39 and automatic gain control 36 which produces a spike of uniform height no matter what magnitude of change in target brightness value is transmitted from camera 56. The output of left video amplifier 39, which is the amplified and clamped output of full-wave rectifier 35 is monitored by left horizontal discriminator 22.

A full explanation of the working of a discriminator of the type shown in this application may be found in the copending patent application of Joseph S. Brugler et al. Ser. No. 487,635 filed Sept. 15, 1965. Left horizontal discriminator 22 produces a series of pulses, $e_1$, which are integrated by left horizontal integrator 19. The output of left horizontal integrator 19, $V_L$, is essentially a dc voltage which changes level in response to the command received from left horizontal discriminator 22. A pulse $e_1$ occurs once each frame as the scanning lines cross through the gate at cross hair 47. If the left edge of target 46 were to move toward the left of the tracking gate at cross hair 47 the magnitude of the output $e_1$ of left horizontal discriminator 22 would increase and if the left edge of target 46 were to move toward the right edge of the gate at cross hair 47 the magnitude of $e_1$ would decrease. After integration the output of left horizontal discriminator 22 may be used as a reference voltage for the left edge of target 46.

It should be noted that left horizontal cross hair 47 and right horizontal cross hair 48 "track" at a relatively high rate, while the camera "follows-up" slowly, much the same way as a human eyeball cites an object, and the head then turns toward the direction in which the eye is looking.

Attention is directed to FIG. 4 as an aid in understanding the operation of the up-down tracking loop. Television camera 56 generates a vertical sync pulse 18 which pulse occurs once each raster and is shown in FIG. 4L. The vertical sync pulse shown in FIG. 4L is used to trigger vertical variable width monostable multivibrator 42 which has a pulse width determined by the magnitude of the output, $V_H$, of vertical integrator 41. The output of vertical variable width monostable multivibrator 42 as shown in FIG. 4M is differentiated and then passed through a negative half-wave rectifier to produce an output spike at time $t_8$. This output spike from vertical variable width monostable multivibrator 42 triggers vertical monostable multivibrator 43, the output of which is shown in FIG. 4N. Vertical multivibrator 43 is on from $t_8$ until $t_9$, which time interval corresponds to the vertical opening of "window" gate 37. This time interval also corresponds to the interval during which vertical discriminator 44 operates.

The processed video which emanates from left video amplifier 39, is controlled by automatic gain control 36, and is coupled to vertical discriminator 44. Discriminator 44 consists of an upper vertical discriminator which outputs a series of positive pulses, $e_u$, and a lower vertical discriminator which emits a series of negative pulses, $e_d$. If the upper edge of the target is displaced higher or lower, that is early or late with respect to the vertical target gate, the value $e_u$ will either be increased or decreased proportional to the amount of displacement. In the same manner, the lower vertical discriminator generates an error signal $e_d$ which signal has a magnitude proportional to the position of the lower target edge with respect to the vertical gate.

The magnitude of $e_u$ and $e_d$ are summed and then integrated to produce a vertical signal $V_H$. Vertical error signal $V_H$ repositions cross hairs 49 and 50 on target and commands the vertical torquers and servos via link 16 to fly the missile in accordance with the tracking error.

Attention is directed to FIG. 3 as an aid in understanding the operation of the right horizontal channel. The right horizontal channel is initiated by the differentiated trailing edge of left horizontal variable width multivibrator 20. This signal passes through early gate 27 which is enabled by the output of vertical multivibrator 43. Thus, the right horizontal channel samples target information only during the vertical tracking time. A pulse coming through early gate 27 sets a flip-flop 29. This pulse as shown in FIG. 3F approximately corresponds to the left edge of target 46. Set flip-flop 29, the output of which is shown in FIG. 3H, enables late gate 28, the output of which is shown in FIG. 3G, and allows processed video to pass through from right video amplifier 38. Since the scan line has passed the left edge of target 46 when late gate 28 is enabled, the next video pulse to appear at the entrance to late gate 28 must correspond to the right edge of target 46. This second video pulse corresponding to the right edge of target 46 shown in FIG. 3E resets flip-flop 29 disabling late gate 28. Thus, late gate 28 is open only from time $t_2$ until $t_5$.

As shown in FIG. 5A, the output of flip-flop 29 consists of pulses corresponding to the width of target 46. These pulses are fed into right horizontal integrator 24. Each horizontal scan line passing through target 46 during vertical tracking time $t_8$ until $t_9$ produces one of these pulses corresponding to the target width. The output of integrator 24, which is the time integral of these pulses, will charge up to a value corresponding to the average width of the target during the vertical tracking time as shown in FIG. 5B. After the vertical tracking time has passed, right horizontal integrator 24 is reset to zero and thus is ready for the next vertical frame.

The output from right horizontal integrator 24 is fed into a peak detector and hold circuit 25. A series of target width pulses appear every vertical frame and the integral of their value thus occurs at the output of right horizontal integrator 24 every vertical frame. Peak detector and hold circuit 25 holds this peak through the entire frame as shown in FIG. 5C. Peak detector and hold circuit 25 is reset by a pulse from vertical variable width multivibrator 42 which resets it to zero every vertical frame. The output of peak detector 25 therefore is a series of pulses which have a rate corresponding to that of the vertical frame rate, a pulse width which is the time from $t_1$ until $t_6$ and an amplitude which corresponds to the average width of target 46.

The output of peak detector and hold circuit 25 is fed into filter 26, and the output of the filter is a dc voltage corresponding to the target width. Filter 26 may consist of a simple lag circuit having one pole. The output of filter 26, $V_R$, as shown in FIG. 5D, is summed with the output of left horizontal integrator 19, $V_L$, by summer 23. Since $V_L$ corresponds to the left edge of target 46 and $V_R$ corresponds to the right edge of the target, their sum corresponds to the center of the target. The output of summer 23 is fed to horizontal torquer amplifier and motor 54 which positions the gimbal such that it points at the center of the target, and the center of the target appears in the center of the television raster.

The generation of cross hairs 47, 48, 49 and 50 may be explained with reference to FIG. 2 and 3. The output of left horizontal multivibrator 21, as shown in FIG. 3C, occurs from time $t_2$ until $t_4$. The time interval $t_2$ to $t_4$ corresponds to the time during which "window" gate 37 is opened. A left horizontal cross hair differentiator 32 differentiates the output of left horizontal multivibrator 21 as shown in FIG. 3I and after rectification the single remaining voltage spike is inserted into video monitor picture 45 by mixer 34 at time $t_2$ thereby forming cross hair 47 on video display 45. Right horizontal cross hair variable width multivibrator 31 is triggered by the output spike derived from the differentiated trailing edge of the output of left horizontal variable width multivibrator 20. The output of filter 26, which corresponds to target width, is simultaneously fed to right horizontal cross hair variable width multivibrator 31. The width of the output pulse from right horizontal cross hair variable width multivibrator 31 as shown in FIG. 3J is determined by the magnitude of the output of filter 26, $V_R$, and corresponds to the width of target 46. The output of multivibrator 31 is differentiated by right horizontal cross hair differentiator 30 to produce a single voltage spike as shown in FIG. 3K which generates cross hair 48 on television monitor display 45 when passed through mixer 34. Vertical cross hairs 49 and 50 result from differentiation by vertical cross hair differentiator 40 of the output from vertical multivibrator 43. The output of vertical cross hair differentiator 40 passes through mixer 34 and then to display 45 via link 15. Mixer 34 additionally provides the means for placing the video output 14 from television camera 56 upon display 45.

Various other means of cross hair generation may be accomplished without departing from the spirit and scope of the invention.

What is claimed is:

1. A television contrast system for tracking targets within the field of view of a television camera for homing missile application comprising:
   television camera means for producing a visual display of a field of view about its optical axis;
   means responsive to said visual display for generating and inserting a first tracking area or gate into said visual display, and means for positioning the first tracking area or gate about a first horizontal edge of a target within the field of view of said television camera comprising:
   a first horizontal variable width multivibrator having triggering means responsive to a first voltage spike and width determining means responsive to a constant voltage,
   a horizontal monostable multivibrator having triggering means responsive to said first horizontal variable width multivibrator, and
   a "window" or AND gate having enabling means responsive to said horizontal monostable multivibrator for defining a horizontal tracking area;
   means for determining the width of the target with respect to said first tracking area or gate; and
   means responsive to movement of said target within the tracking area or gate for maintaining the first horizontal edge of the target within said first tracking area or gate, and means responsive to said width of the target so that the optical axis of said television camera is always aligned with the centeroid of said target.

2. The system of claim 1 wherein the means for determing the width of the target with respect to said first tracking area or gate comprises:
  a flip-flop responsive to an "early" gate which "early" gate is responsive to said left horizontal variable width multivibrator and said "early" gate is also responsive to a vertical multivibrator; and
  said flip-flop is reset by a "late" gate responsive to a signal corresponding to the trailing edge of said target.

3. The system of claim 2 wherein the means for generating said error signal for aligning the optical axis of said television camera with the centroid of the target comprises:
  a horizontal discriminator which produces a horizontal error signal proportional to the position of said first edge of the target within said first tracking area or gate;
  means for integrating the output of said horizontal discriminator;
  a second integrator for integrating the output of said flip-flop;
  means for detecting the peak output of said second horizontal integrator and holding the peak for one frame;
  means for resetting the second horizontal integrator and peak detector each frame;
  means for filtering the output of said peak detector to produce a dc signal; and
  means for summing the output of said first horizontal integrator and said filter to produce an error signal for aligning the optical axis of said television camera with the centroid of the target.

4. The system of claim 3 and further including means for generating cross hairs which define the tracking area.

5. The system of claim 4 wherein the means for generating said cross hairs comprise:
  a first differentiator which operates on the signal produced by the first horizontal monostable multivibrator;
  means for combining the output of said first differentiator with the output of said television camera;
  a right horizontal cross hair variable width multivibrator which operates on the signals produced by the left horizontal variable width multivibrator and the signal produced by said filter;
  a second differentiator which operates on the signal produced by the right horizontal cross hair variable width multivibrator; and
  means for combining the output of said second differentiator with the output of said television camera.

* * * * *